Dec. 28, 1965 M. SCHIBLI 3,225,869
LOGICAL ELEVATOR CONTROL SYSTEM USING
MINIMUM LOGICAL COMPONENTS
Filed Nov. 15, 1961 10 Sheets-Sheet 8

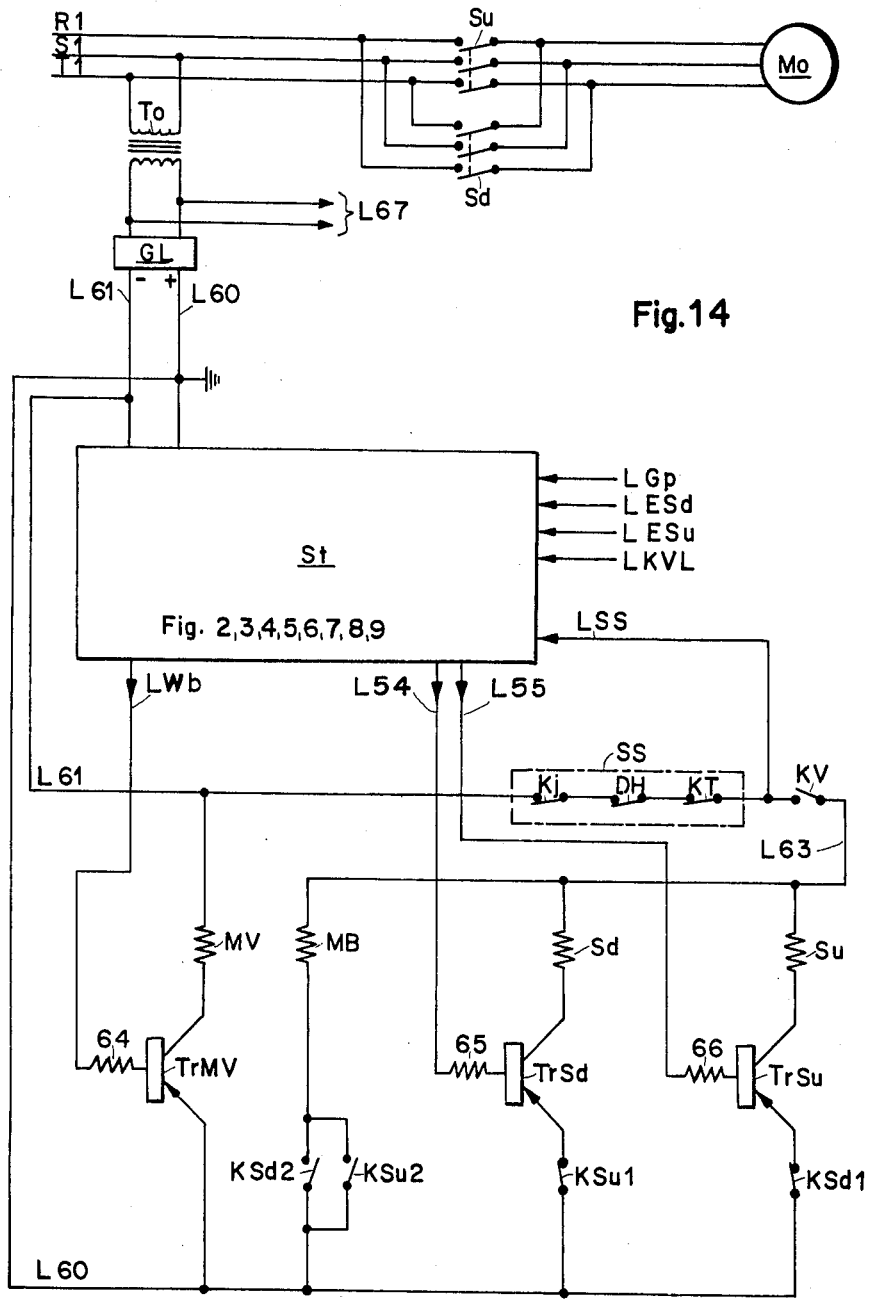

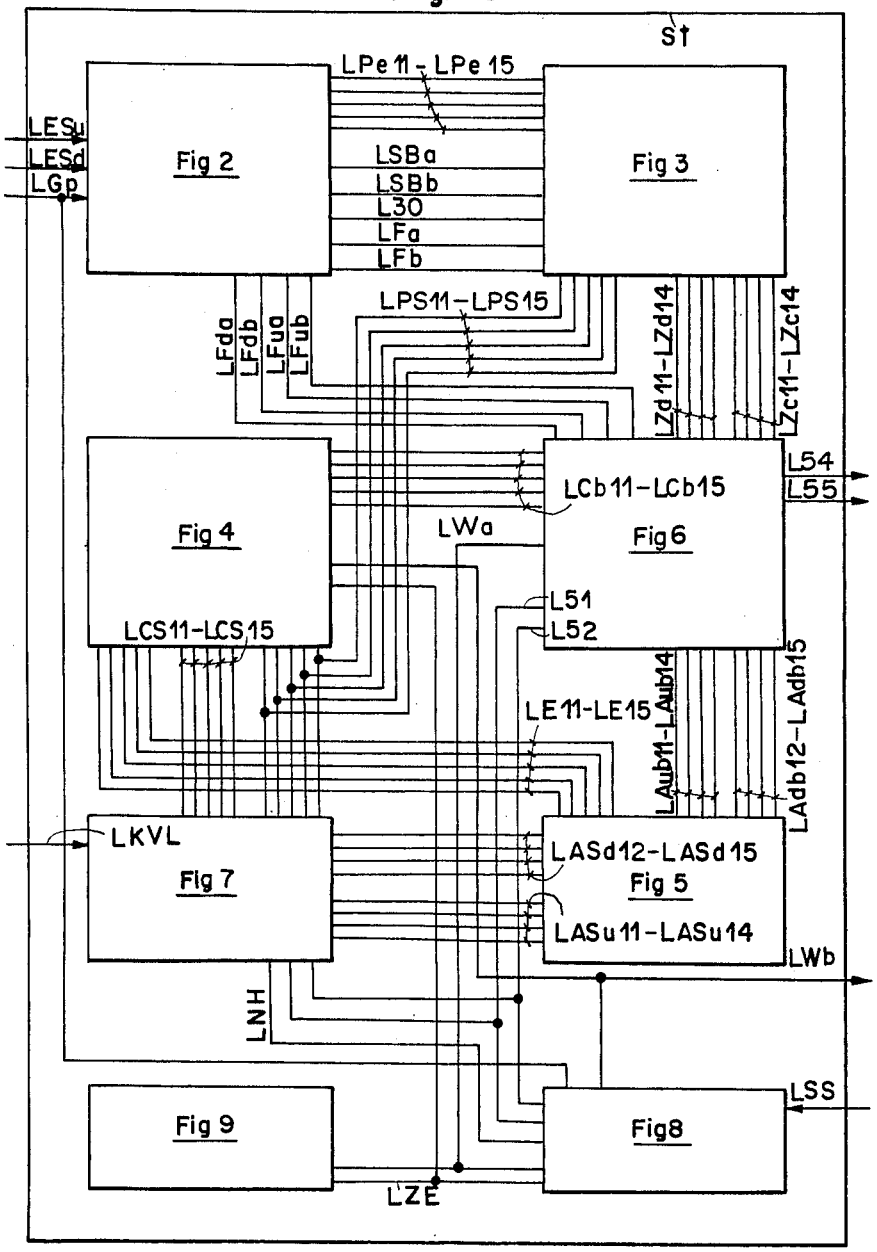

United States Patent Office 3,225,869
Patented Dec. 28, 1965

3,225,869
LOGICAL ELEVATOR CONTROL SYSTEM USING MINIMUM LOGICAL COMPONENTS
Marcel Schibli, Zurich, Switzerland, assignor to Schweizerische Wagons- und Aufzugefabrik A.-G. Schlieren-Zurich, Schlieren, Switzerland
Filed Nov. 15, 1961, Ser. No. 152,565
Claims priority, application Switzerland, Nov. 25, 1960, 13,234/60
8 Claims. (Cl. 187—29)

The present invention relates to an elevator control system comprising static switching elements.

Elevator plants with high transport capacity are generally equipped with so-called "collective controls" in which, as is well known, the calls are not answered chronologically in accordance with their arrival but in a sequence depending on the position and of the travel direction of the cabin. In order that a cabin may attend to each of the floors floor bound informations are required which generally are divided into groups of functionally separated informations. Such groups are: cabin call buttons, outer call buttons "up" and outer call buttons "down." The calls that are present are separated into "directional" and into "contra-directional" calls. A call is designated as a "directional" call when the travel direction it requires corresponds to the actual direction of travelling of the cabin, and directional calls are attended to one after the other. A directional call arriving at an elevator station after the cabin has left may only be attended to after two changes of the travel direction. Further a call is designated as "contra-directional" call when the travel direction it requires asks for a change of the direction in which the cabin actually travels.

If no directional calls are present in the travel direction of the cabin, then the cabin will first attend the contra-directional call which, with respect to the travel direction, is at the greatest distance from the cabin position.

Elevator controls of this type have been built in the conventional "relay technique," which, as experience has extensively proved, is not reliable owing to its sensibility to dirt and to the rapid wear of the movable parts. Also in many instances these conventional controls do not meet the actual requirements of high switching speed in modern elevator controls.

It is a primary object of the present invention to avoid these drawbacks and to provide an elevator control system having standardized and economical static switching elements.

To this end the invention contemplates an elevator control system in which call-responsive memory elements as well as a control member determining the cabin position act on floor-associated switching means determining stops.

Other features and advantages of the invention will become apparent from the description now to follow of a preferred embodiment thereof given by way of example only and in which reference will be made to the accompanying drawings, in which:

FIGURE 14 shows the drive and the control of the elevator, and

FIGURE 15 is a block diagram of the control.

Figure 1:
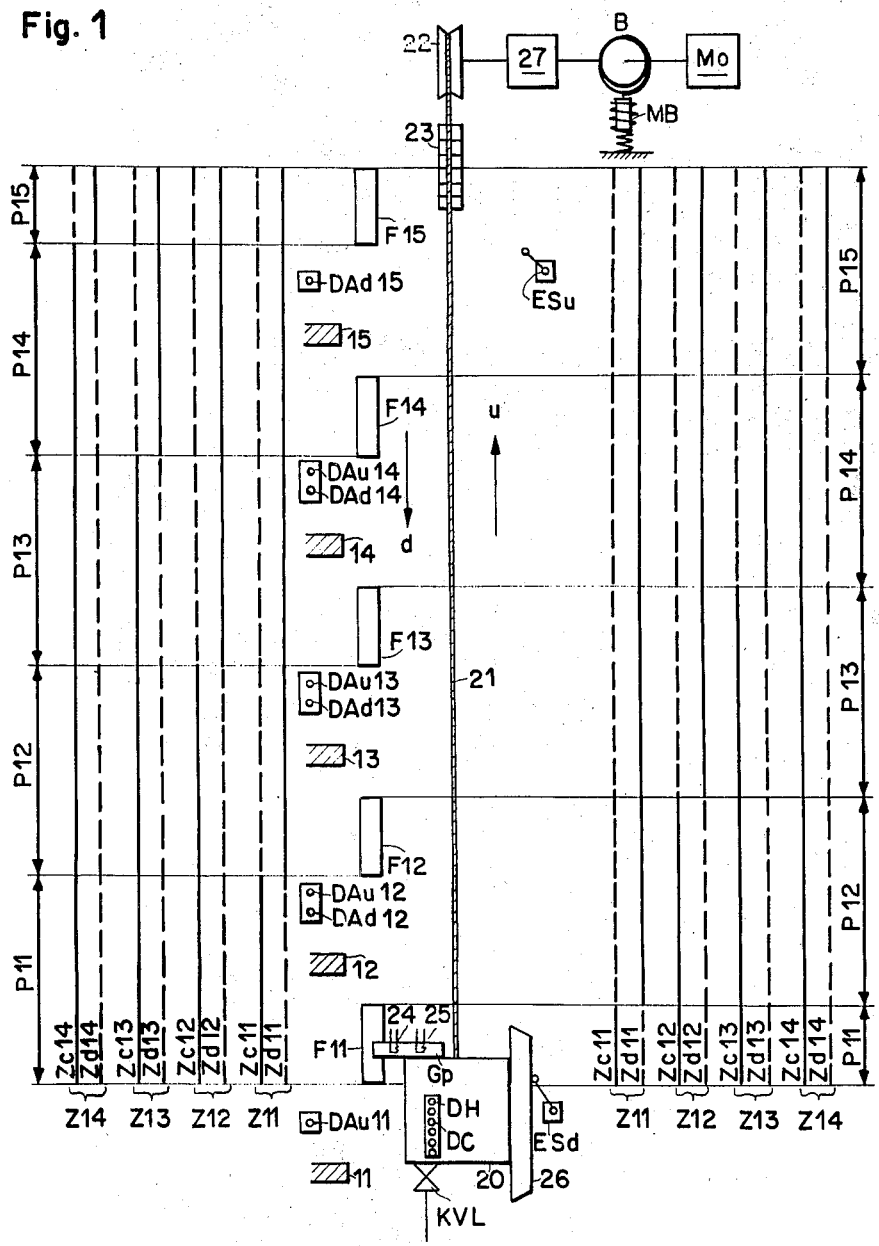
FIGURE 1 represents an elevator plant showing the division of its run into signal zones.

FIGURE 1 illustrates an elevator plant attending for the sake of simplification floors 11–15. For the following description, the reference numerals 11–15 will be used for characterizing elements associated with the floors and designated by letters. Outer call buttons $DAu11$ to $DAu14$ for upward travel and outer call buttons $DAd12$ to $DAd15$ for downward travel act as information sources for the control, consisting of the parts illustrated in FIGURES 2 to 9.

Reference numeral 20 designates an elevator cabin connected by means of cables 21, extending over a driving pulley 22, with a counterweight 23. The driving pulley 22 is mounted on the slowly rotating shaft of a gear 27 driven by an induction motor $Mo$. A brake $B$ is mounted between the gear 27 and the motor $Mo$ and is actuated by a magnet $MB$.

The cabin 20 is provided with call buttons $DC$ and further with a stop button $DH$. On the top of the cabin 20 there is arranged a generator in form of an induction switch $Gp$ having a primary winding 24 and a secondary winding 25 separated by an air cap. The primary winding 24 supplied with A.C. produces in the secondary winding 25 an A.C. output signal which is transformed in known way in a rectifier (not shown) into a D.C. signal. The shaft contains lugs $F11$–$F15$ which, at the passage of the cabin 20, project into the air gap of the induction switch $Gp$ resulting in the production of a position-dependent signal sequence. Further a slide 26 provided on the cabin 20 operates a pair of end switches $ESd$ and $ESu$ at the end stops. If the end switch $ESd$ or $ESu$ respectively is operated by the slide 26 an output signal 0 is produced by this switch. On the floor of the cabin 20 there is arranged a full load device (not shown) of known construction actuating a contact $KVL$ when the maximum load is reached.

The control is based on a binary system working with two signal values "0" and "1." A lead has a signal "0" when there is no potential between it and a reference potential. As soon as there is a potential between this lead and the reference potential the lead effectively carries the signal "1."

The stroke of the cabin is divided $(n-1)$ ways into zones wherein $n$ designates the number of floors. With each zone there is associated a zone unit described with reference to FIGURE 3 having output elements $Zc$ and $Zd$. The solid line (FIG. 1) corresponds to the output value 1 and the broken line corresponds to an output value 0, and value 1 of element $Zc$ represents the distance separating the corresponding lug $F$ from the lower end stop and the value 1 of element $Zd$ represents the distance separating the corresponding lug $F$ from the upper end stop. When the induction switch $Gp$ leaves a lug $F$ this results in a modification of the output value of the corresponding zone unit. Since the exit from the lug $F$ initiates the signal change, the place of this change is not the same for the upward travel $u$ and for the downward travel $d$ as is visible from this figure. For determining the position of the cabin a so-called position element $Pe$ is used evaluates an output value of two adjacent zone units. These output values are represented for the distances P11 and P12 etc.

Figure 10:
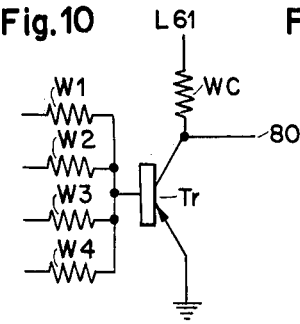
FIGURE 10 illustrates a transistor connected as a "nor"-element.
Figure 11:
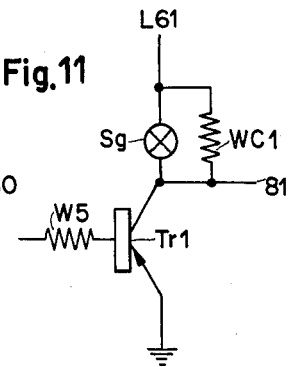
FIGURE 11 shows a signal element.
Figure 12:
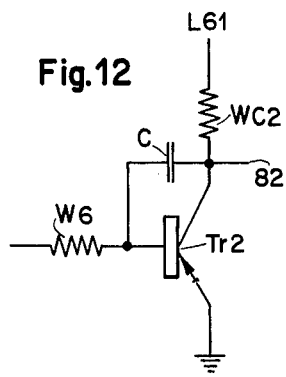
FIGURE 12 shows a "nor"-element for deceleration.

The following switching diagram is based on a static switching means consisting at least of a "nor"-element. This "nor"-element, as will be described in detail with reference to FIGURES 10–12, issues an output signal 1 when all its input signals have the value 0 and produces an output signal 0 as soon as at least one input signal takes the value 1.

Of course this static switching means may consist of other static elements for example of a combination of "and," "or"-"not" and memory elements, whereby this has for the elevator plant the same effect as described for the following control.

Figure 2:
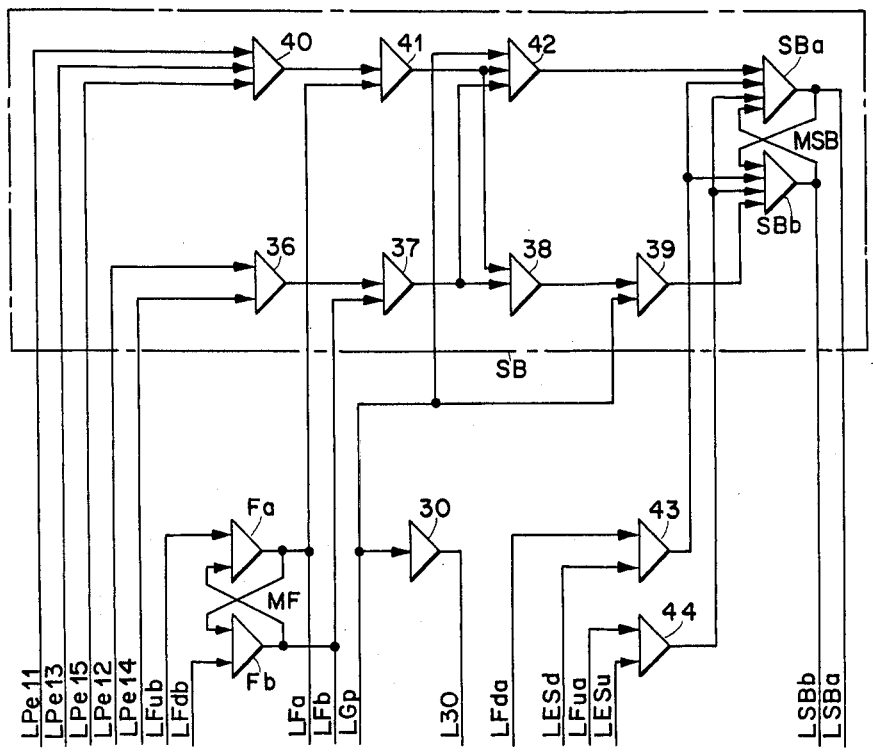
FIGURE 2 shows a step limiter for a step-by-step switching device.
Figure 3:
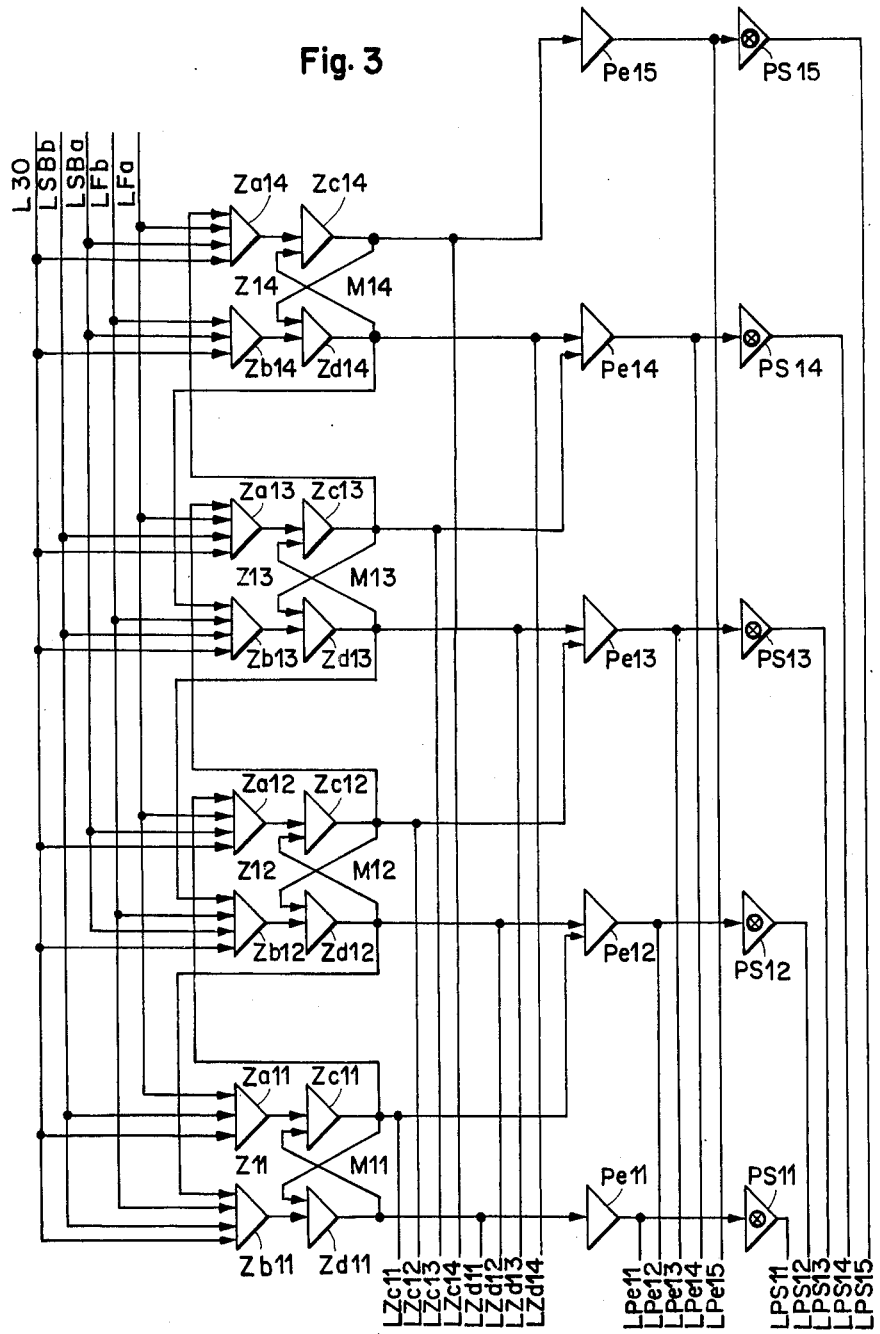
FIGURE 3 shows zone units and corresponding position and signal elements for the step-by-step switching device.

In FIGURES 2 and 3 there is shown the diagram of the control element, determining the cabin position, in the form of a step-by-step switching device. It is assumed that the cabin is at floor 11. The lugs F (FIGURE 1) are adjusted in such manner than the corresponding lug is in the air gap of the induction switch Gp when the cabin is at rest at a floor. Consequently the secondary winding 25 produces no signal, i.e. Gp=0.

Figure 6:
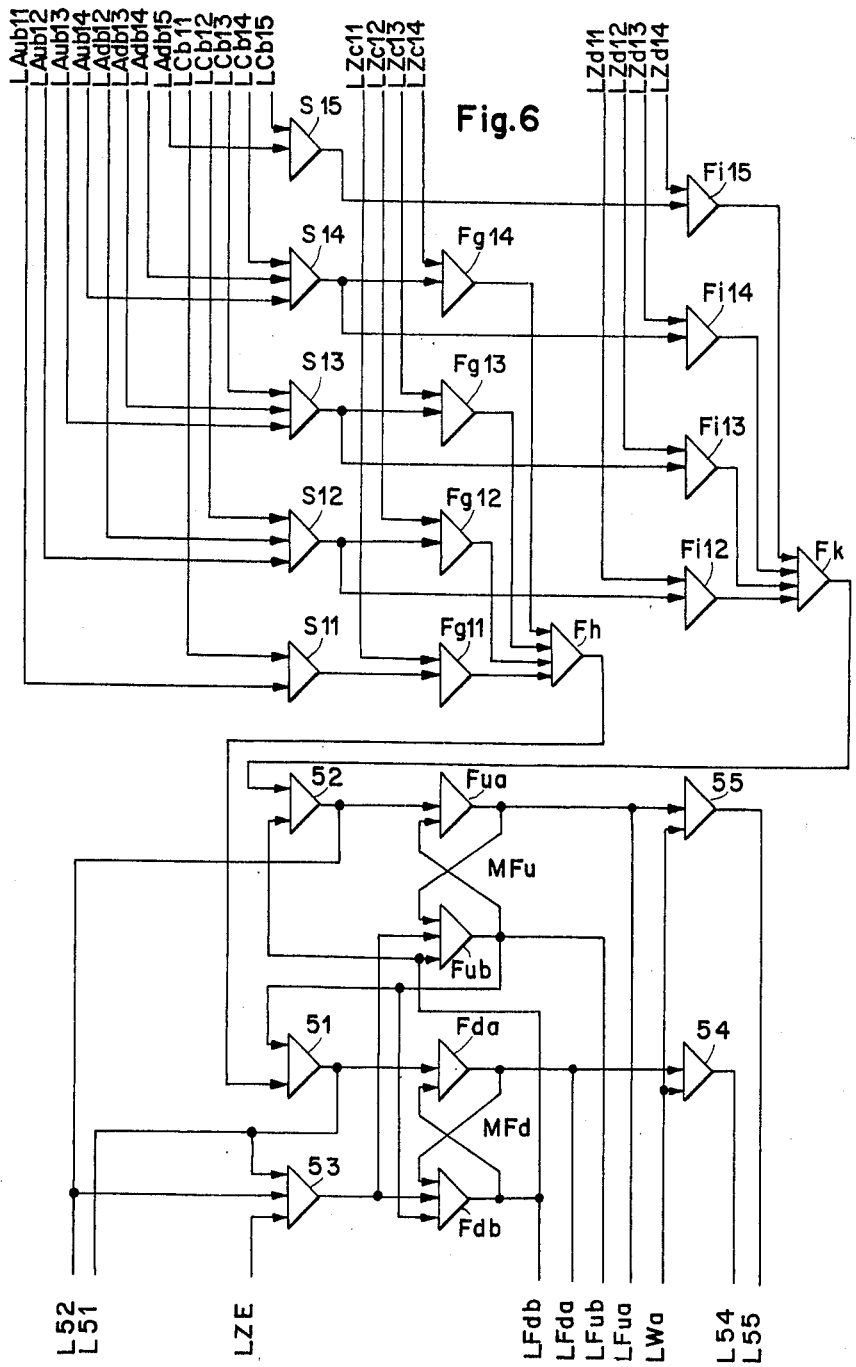
FIGURE 6 is a diagram of a circuit for travel direction determination.
Figure 7:
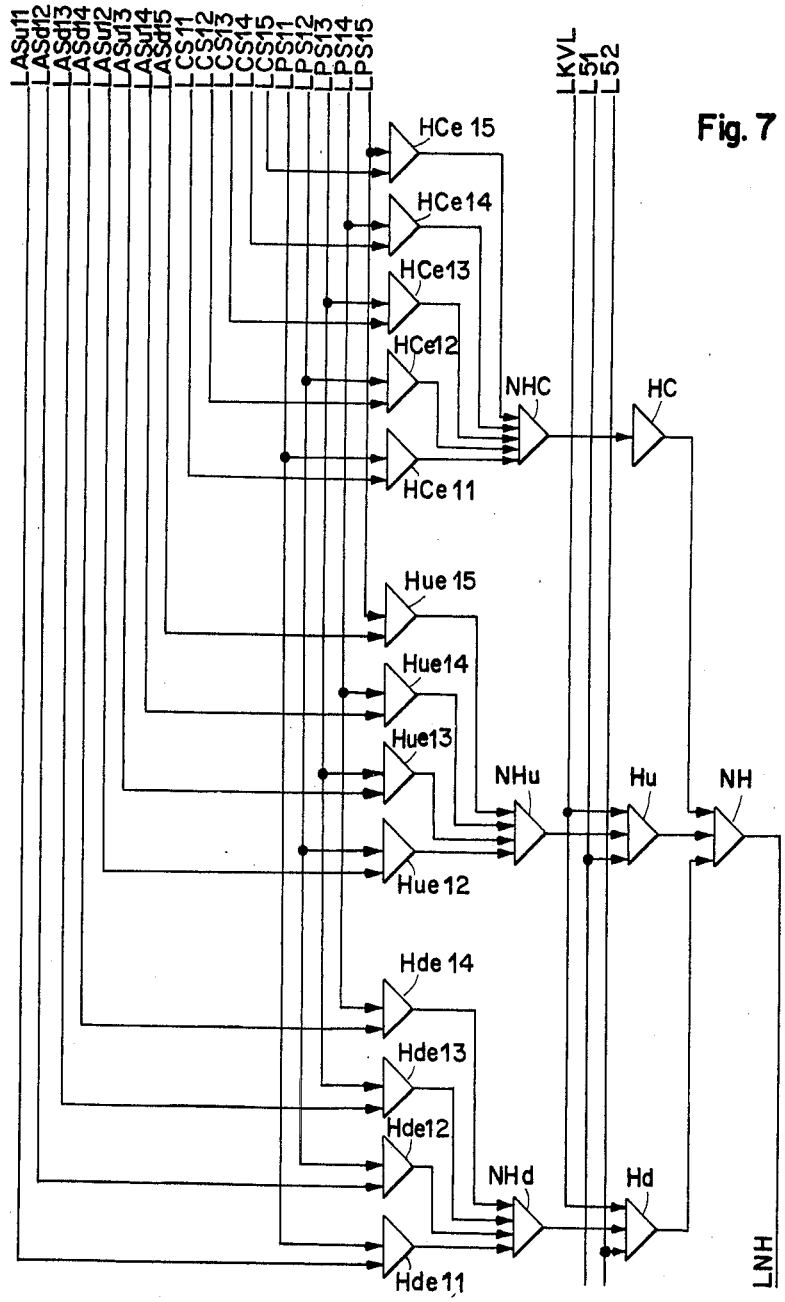
FIGURE 7 is a diagram of a circuit for the determination of stop.

The induction switch Gp is connected by means of a lead LGp with an element 30 the output of which acts on a lead L30. In accordance with the direction of travelling of the cabin and as shown in FIGURE 6 elements Fub and Fdb respectively produce signals of direction on leads LFub for upward travelling and LFdb for downward travelling. The lead LFub leads to the first input of the other element Fb. The output of element Fa serves as a second input to element Fb and is further connected with a lead LFa. The output of element Fb serves as a second input to element Fa and is further connected to a lead LFb.

An element 40 has three inputs LPe11, LPe13 and LPe15 coming from the corresponding position elements Pe described in FIGURE 3. The output of element 40 serves as a first input to an element 41 the second input of which is connected to lead LFa.

A further element 36 has two inputs LPe12 and LPe14 again coming from corresponding position elements Pe. The output of element 36 serves as a first input to an element 37 the second input of which comes from lead LFb. The output of element 37 acts on the first inputs of elements 38 and 42. The second inputs of these elements 38 and 42 are connected to the output of element 41. The third input of element 42 is connected to the lead LGp. The output of element 42 supplies the first input of an element SBa of a memory element MSB. The output of element 38 is connected with a first input of an element 39 and the second input thereof is connected to the lead LGp. The output of element 39 acts as first input of the other element SBb of the memory element MSB. The output of element SBa is connected on the one hand to the second input of element SBb and on the other hand to a lead LSBa. The output of element SBb leads on the one hand to the second input of element SBa and on the other hand to a lead LSBb. The described elements 36 to 42 as well as the memory element MSB form the so-called step limiter designated SB in FIGURE 2.

The step-by-step switching device is provided with a correcting means permitting to bring it into the corresponding starting position at the end stops, should the step-by-step switching device have been disturbed by outside influences. The correcting means consists of elements 43 and 44. The output of end switch ESd leads over a lead LESd to the first input of element 43. A lead LFda coming from an element Fda of a memory element MFd (FIGURE 6) acts as second input to element 43 the output of which serves as a third input to the elements SBa and SBb of the memory element MSB. The output of end switch ESu leads over a lead LESu to the first input of element 44. A lead LFua coming from an element Fua of a memory element MFu of FIGURE 6 acts as a second input to the element 44 the output of which is connected as fourth input to the elements SBa and SBb.

The diagram shown in FIGURE 3 represents on the one hand $(n-1)$ zone units designated as Z11 to Z14 and on the other hand the position units generally designated by P and identical with the number of floors. Each zone unit Z consists of a memory element M having the corresponding elements Zc and Zd and correspondingly connected elements Za and Zb responsive to the travelling direction. A position unit consists of the corresponding position element Pe and of a signal element PS.

The elements Za and Zb usually comprise four inputs. The first input is connected to the lead L30. The second input of elements Za and Zb which are designated with an even index of number is connected with the lead LSBa and the second input of these elements Za and Zb having odd index of numbers is connected with lead LSBb. The third input of the elements Za is connected with the lead LFa and the third input of the elements Zb is connected with lead LFb. The fourth input of the element Za is connected to the output of the corresponding elements Zc with the index of numbers reduced by 1, except for element Za11 which has no fourth input and the fourth input of the elements Zb is connected to the output of the corresponding elements Zd with the index of numbers increased by 1, except element Zb14 which has only three inputs. In other words, since no further zone unit is connected before the zone unit Z11 and since no further zone unit is connected after zone unit Z14 the fourth input is missing at element Za11 and the element Zb14, respectively.

Within the same zone limit the elements are connected as follows: Element Zc has two inputs. The first input is connected with the output of element Za and the second input is connected with the output of element Zd. The element Zd also has two inputs the first of which is connected to the output of element Zb and the second of which is connected to the output of element Zc.

The position elements Pe generally have two inputs. The first input is connected with the output of the element Zd of the same index number and the second is connected with the output of the element Zc having the index number less 1. The outputs of the elements Zc and Zd are also connected to corresponding leads LZc and LZd, respectively. The element Pe11 has only one input since no further zone units are connected before the zone unit Z11. Also element Pe15 has only one input since there is no zone unit having the same index number. The outputs of the elements Pe are connected on the one hand to the corresponding lead LPe with the corresponding index number and on the other hand to a corresponding signal element PS. The outputs of the signal elements PS are connected to corresponding leads LPS.

Figure 4:
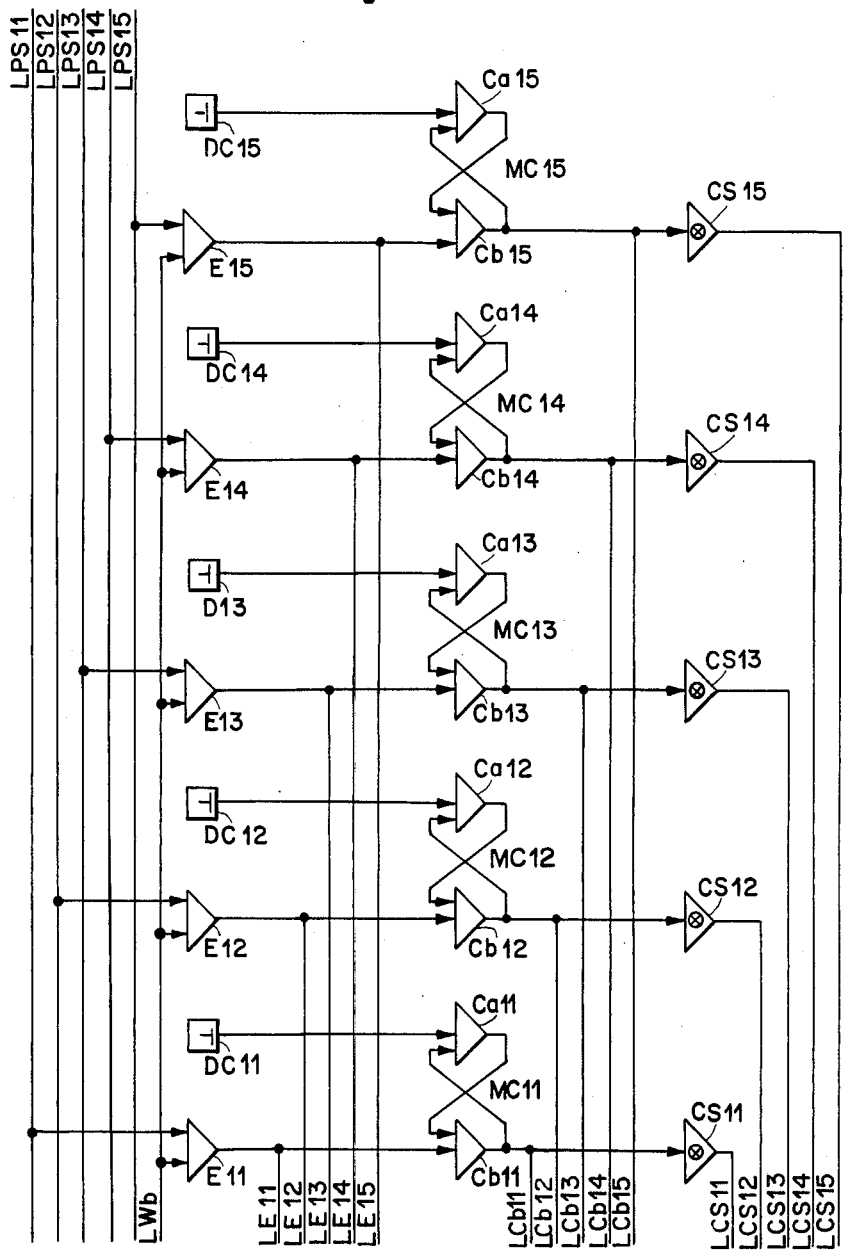
FIGURE 4 is a diagram of the cabin calls with associated cancelling elements.

FIGURE 4 shows the elements associated with the cabin calls. With each floor there is associated a memory element MC consisting each of elements Ca and Cb. The first input of each element Ca is connected with the output of the corresponding push-button element DC. The latter is shown in detail in FIGURE 13.

As soon as the cabin 20 reaches floor stop the call stored in the memory elements associated to this stop should be cancelled. To this end there are provided cancel elements E one input of which is connected over a lead LWb with the output of an element Wb described hereinafter with reference to FIGURE 8. The other input is connected to the lead LPS with the corresponding index number. The output of each cancel element E is connected on the one hand with the first input of the corresponding element Cb and on the other hand with the corresponding lead LE. The outputs of the elements Ca and Cb serve as reciprocal last inputs. The output of the element Cb is also connected to a signal element CS for indicating the call acceptance of the corresponding cabin call and further to a corresponding lead LCb. The output of each of the elements CS is connected to a corresponding lead LCS.

Figure 5:
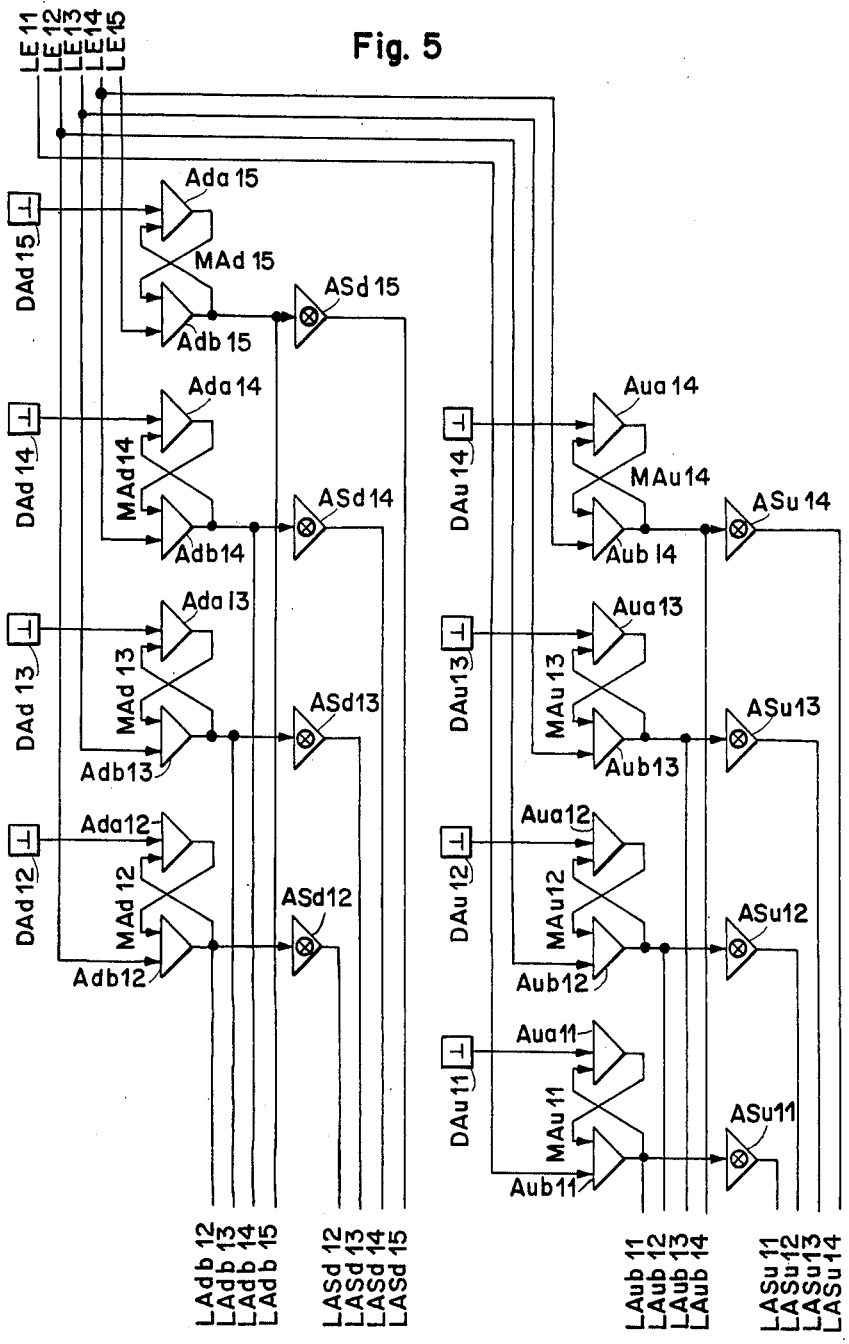
FIGURE 5 shows a diagram of a circuit for outer calls.

FIGURE 5 represents the elements associated with the outer calls "up" and "down." With each of the floors 12 to 15 there is associated a memory element MAd consisting of elements Ada and Adb. The first input of element Ada is connected to the corresponding push-button element DAd and the first input of element Adb is connected with the corresponding lead LE. The outputs of the elements Ada and Adb serve as reciprocal second inputs. The output of element Adb is connected on the one hand to the input of the signal element ASd for indicating the acceptance of the call and on the other hand to a corresponding lead LAdb. The output of each signal element ASd leads to a corresponding lead LAsd.

With each of the floors 11 to 14 there is associated a memory element MAu consisting of elements Aua and Aub. The first input of element Aua is connected to the corresponding push-button element DAu and the first input of element Aub is connected with the corresponding lead LE. The outputs of the elements Aua and Aub serve as reciprocal second inputs. Moreover the output of element Aub is connected on the one hand with the input of a corresponding signal element ASu indicating acceptance of the call and on the other hand with a corresponding lead LAub. The output of each signal element ASu leads to a corresponding lead LASu.

The elements of FIGURE 6 serve to determine the travel direction. A call signal from above the cabin position requires an upward travel of the cabin. If such a call comes from below the cabin position a downward travel will be necessary. For the predetermination of the travel direction there are provided floor-associated elements Fg for downward travel and Fi for upward travel. Since in collective controls different calls may be given for each floor there are provided floor-associated elements S affording for the sum formation of the floor-associated calls.

The first input of the elements S is connected with the corresponding lead LCb. The second input of the elements S11 to S14 is connected to the corresponding lead LAub and that of element S15 to lead LAdb15. The third input of the elements S12 to S14 is connected with the corresponding lead LAdb. The first input of the elements Fg and Fi is connected with the output of the corresponding element S and the second input of the elements Fg is connected with the corresponding lead LZc. The second input of element Fi12 is connected with the lead LZd11 that of the element Fi13 is connected with the lead LZd12, that of the element Fi14 is connected with the lead LZd13 and that of the element Fi15 is connected with the lead LZd14. The outputs of the elements Fg serve as inputs to a collective element Fh and the outputs of the elements Fi serve as inputs of a collective element Fk.

In collective controls the selected travel direction of the cabin shall be maintained until all calls present for this travel direction are executed. In order to meet this requirement the signal of the predetermined travel direction is stored in the memory elements MFu and MFd, respectively.

The first inputs of elements 51 and 52 respectively, are connected with the outputs of the elements Fh and Fk. The outputs of the elements 51 and 52 respectively are connected, on the one hand, with the first input of the one element Fda of the memory element MFd and with the first input of the one element Fua of the memory element MFu, respectively, and, on the other hand, through leads L51 and L52 respectively, with the first and second inputs of an element 53. The third input of element 53 leads, through a lead LZE to the time element represented in FIGURE 9. The output of element 53 is connected to the second inputs of the elements Fdb and Fub. The outputs of the elements Fua and Fub and Fda and Fdb respectively serve as reciprocal second inputs. In order to prevent that both travel directions are switched-in simultaneously the outputs of the elements Fdb and Fub respectively are connected with the last inputs of the elements Fub and 52 and Fdb and 51 respectively. Moreover the outputs of the elements Fdb and Fub respectively are connected with the leads LFdb and LFub respectively. Further the outputs of the elements Fda and Fua respectively are connected on the one hand with one of the inputs of elements 54 and 55 respectively and, on the other hand with the leads LFda and LFua respectively. The other input of the elements 54 and 55 is connected with the lead LWa. The output of the element 54 is connected to a lead L54 and that of element 55 to a lead L55.

In collective controls (see FIG. 7), as has already been mentioned the cabin attends one after the other all calls originating from points lying in its travel direction, i.e. all so-called directional calls.

If contradirectional calls are present only, the cabin stops at the farthest away contra-directional call. This stop condition is met for the cabin calls by floor-associated elements HCe and for the outer calls by floor-associated elements Hue and Hde. The elements HCe and for the outer calls by floor-associated elements HCe, Hue and Hde each form functionally separate groups of elements.

One of the inputs of the elements HCe, Hue and Hde is connected with the corresponding lead LPS. The other input of the elements HCe is connected to the corresponding lead LCS. The other input of the elements Hue12 to Hue14 and Hde12 to Hde14 respectively is connected with the corresponding leads LASu and LASd respectively, while the input of the element Hue15 is connected with the lead LASd15 and that of the element Hde11 with the lead LASu11. The outputs of the elements HCe, Hue and Hde respectively serve as inputs to collective elements NHC, NHu and NHd respectively, the outputs of said collective elements leading to the first input of elements HC, Hu and Hd respectively. The second input of the elements Hu and Hd are connected via a lead LKVL with a full load contact KVL (FIGURE 1). The third input of the element Hu is connected with lead L51 and that of the element Hd with lead L52. The outputs of the elements HC, Hu and Hd serve as inputs to a collective element NH the output of which leads to a lead LNH.

Figure 8:
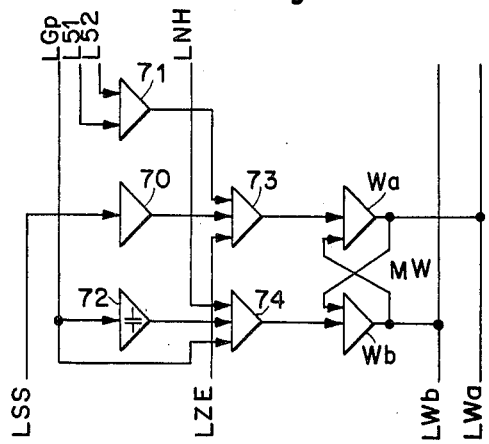
FIGURE 8 is a diagram of a circuit for the determination of travel distance.

The elements of FIGURE 8 serve to determine the travel distance. Element 71 has inputs L51 and L52 and its output serves as first input to an element 73. The input of an element 70 is connected by a lead LSS to a safety circuit SS represented in FIGURE 14. The output of element 70 is connected with the second input of element 73. The third input is connected with lead LZE. The lead LGp on the one hand is connected to the input of an element 72 and on the other hand to the first input of an element 74. Since the output of element 72 which is a delayed "nor"-element according to FIGURE 12 also acts on the element 74 (second input) it is apparent that the cancelling signal for a memory element MW for determining the travel distance may appear only when the induction switch Gp enters a lug F. The third input of element 74 is connected to lead LNH. The output of element 73 is connected with the first input of element Wa and the output of element 74 is connected with that of the other element Wb of the memory element MW. The outputs of the elements Wa and Wb, on the one hand, serve a reciprocal second input and, on the other hand the output of element Wa is connected with a lead LWa and that of element Wb with a lead LWb.

In order to make possible for the passengers to enter and to leave the cabin there is provided a time-element (FIG. 9) determining the duration of stopping of the cabin when further not answered calls are present.

The input lead LWa is connected via a diode 90 and a Zener-diode 91 on the base of a transistor Tr5 the emitter of which is grounded. A junction 94 connecting both diodes is connected on the one hand via a condenser C1 with the output of an element NZE and on the other hand via a resistance 92 with a negative supply lead L61. The collector of the transistor T$r$5 is connected by a resistance 93 to the lead L61 and on the other hand to the input of the element NZE. The output of the element NZE is further connected with the input of an element ZE. The output of element ZE is connected to the output lead LZE.

Upon interruption of the travel of the elevator the storing device MW (FIGURE 8) thereof, which determines the travel supplies a negative signal to the lead LW$a$. This makes effective the R-C member consisting of the resistance 92 and the condenser C1. If the condenser C1 is loaded to such an extent that the potential level at the connection point 94 exceeds the locking potential of the Zener-diode 91 a control current will flow through the emitter-base path of the transistor T$r$5. This makes the transistor T$r$5 conductive, its output signal changes from 1 to 0, the output of element NZE receives a signal 1 and the lead LZE a signal 0. The connection of the condenser C1 with the output of element NZE constitutes a so-called feed-back permitting rapid change of the signal at the elements NZE and ZE.

The main part of the "nor"-element according to FIGURE 10 advantageously consists of a transistor T$r$. The inputs are connected with the base of the transistor via resistances, the number of which depends on the connection, for example those designated by W1, W2, W3 and W4. The emitter of this transistor is grounded while its collector is connected via a resistance WC to the negative supply line L61 of the control. Further the collector is connected with the output 80 of the "nor"-element.

The input resistances W of this "nor"-element may also be replaced by diodes whereby the latter act on the base via an additional resistance.

The signal element mentioned in the description is shown for example in FIGURE 11. The input is connected with a resistance W5 with the base of a transistor T$r$1. Its emitter is grounded and its collector in connection via a signal lamp S$g$ to the negative supply line L61. The collector is connected to output 81. A resistance WC1 is connected in parallel with signal lamp S$g$ in order to avoid disturbances of the output effect on the control should the signal lamp S$g$ burn out.

FIGURE 12 illustrates the delayed "nor" element mentioned with regard to FIGURE 8. The input is connected via a resistance W6 to the base of a transistor T$r$2 the emitter of which is grounded and the collector of which leads to the negative lead L61 via a resistance WC2. The collector is connected with an output 82. A condenser C is connected between the collector and the base in a such manner that due to loading of the condenser a delay of the signal at output 82 is produced.

Figure 13:
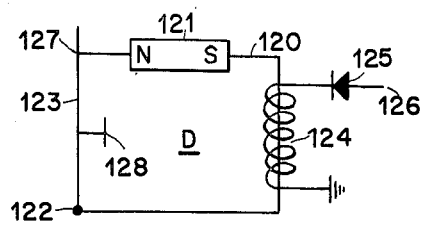
FIGURE 13 shows a push-button element.

FIGURE 13 shows the diagrammatical structure of the push-button element D mentioned with reference to FIGURES 4 and 5. A permanent magnet 121 is mounted in a U-shaped iron-core 120. At a point 122 there is articulated a pole shoe 123 connecting the two legs of the iron core. The web of the U-shaped core 120 carries a winding 124 one end of which is grounded and the other end of which leads through diode 125 to an output 126 of the push-button element D. The aforementioned permanent magnet 121 produces a magnetic flux in the core 120 and thereby a forced connection of the pole shoe 123 with the core 120 at a contact point 127. If by means of the push-button 128 the pole shoe 123 is moved away from contact point 127 a suddenly increasing air gap occurs at the contact point 127. This air gap produces in the core 120 a sudden change of the flux in turn producing a potential pulse in the winding 124 appearing at the output 126 as a negative signal.

FIGURE 14 shows the drive and the control of the elevator. The motor M$o$ is supplied by means of the leads R1, S1, T1 and over travel direction relays S$u$ and S$d$ respectively. The primary winding of a transformer T$o$ is connected with the leads S1 and T1, while the secondary winding leads on the one hand to a rectifier GL and on the other hand via a lead L67 to the primary winding 24 of the induction switch G$p$ (FIGURE 1). The pulsating direct current on the secondary side of the rectifier GL is smoothed in a known way and guided to leads L60 and L61. Lead L60 is positive and grounded while lead L61 has a negative potential. Both leads L60 and L61 supply a control S$t$ consisting of FIGS. 2 to 9. Inputs LG$p$, LES$d$, LES$u$, LKVL and LSS lead to the control S$t$. The objects of the first four inputs have already been described in FIGURES 1 and 2. The lead L61 is connected to the safety circuit SS consisting of a contact K$j$ of the catching device, of the stop button DH and of door contacts KT connected in series. The output of the safety circuit SS on the one hand is connected via lead LSS to the control S$t$ and on the other hand via contacts KV connected in series for the locking check of the doors, to a lead L63. For the sake of clarity only one of the contacts KT and KV have been represented.

The control S$t$ has the three already described outputs L54, L55 and LW$b$ (FIGURES 6, 8). The output LW$b$ is connected via a resistance 64 with the base of a transistor T$r$MV. The emitter of this transistor T$r$MV is connected with the lead L60 and the collector is connected through the coil of a door locking magnet MV to lead L61. The output L54 is connected with the base of a transistor T$r$S$d$ via a resistance 65. The emitter of the transistor is connected via an auxiliary contact KS$u$1 of the direction switch S$u$ to the lead L60 and the collector of the same transistor is connected with the lead L63 through a relay coil S$d$.

The ouput L55 is connected by a resistance 66 with the base of a transistor T$r$S$u$ the emitter of which is connected by an auxiliary contact KS$d$1 of the direction switch S$d$ with the lead L60 and the collector of which is connected by the relay coil S$u$ with the lead L63. The lead L63 is further connected by the coil of the braking magnet MB and by auxiliary contacts KS$d$2 and KS$u$2, connected in parallel with the relays S$d$ and S$u$ with lead L60.

In FIGURE 15, the connection within the control S$t$ (FIGURE 14) between the control parts shown in FIGURES 2 to 9 are visible. For example the lead designated by LPS15 in FIGURE 3 leads on the one hand to FIGURE 7 and on the other hand to FIGURE 4.

*Rest position of the control*

According to FIGURE 1, the cabin is at rest at floor 11. In this position of the cabin, the step-by-step switching device has the following starting condition: lead LG$p$ (FIG. 2) has a signal 0 and thus lead L30 carries a signal 1. Therefore all outputs of the elements Z$a$ and Z$b$ (FIGURE 3) are 0. Since the cabin at the last travelling effected a downward movement to stop 11 the elements Z$c$ have an output 1 and the elements Z$d$ have an output 0. The element P11 has an output 1 while the other elements P$e$ have an output 0. Thus the signal element PS11 receives an input 1 resulting in a lighting of the corresponding lamp.

In the above-stated rest position of cabin 20 the elements of FIGURE 2 have the following states: 30=1, F$b$=0, F$a$=1, 36=1, 37=0, 38=1, 39=0, 40=0, 41=0, 42=1, SB$a$=0, SB$b$=1, 43=0, 44=0.

Since no calls are present, all memory elements MC (FIGURE 4) MA$d$ and MA$u$ (FIGURE 5) are cancelled. It results therefrom that all inputs of the elements S (FIGURE 6) are 0 so that the elements 51 and 52 produce output signals 0. The lead LZE coming from the time-element (FIGURE 9) carries, in the rest position of the cabin a signal 0 so that the output of element 53 supplies a cancelling signal to the memory elements MF$u$ and MF$d$. Thus the elements F$da$ and F$ua$ present an output signal 1 resulting in the leads L54 and L55 in a signal 0. The relay coils Sd and Su (FIG. 14) thus are not energized.

*Travel examples*

As has already been mentioned, the cabin is at floor 11. It is assumed that on floor 12 (FIG. 1) the outer push-button "up" (DAu12) and on floor 15 the outer push-button "down" (DAd15) are operated. The signal 1 produced by the actuation of the push-button elements DAu12 and DAd15, respectively is stored in the memory elements MAu12 and MAd15 (FIGURE 5), respectively. This results in a signal 0 at the outputs of the elements Aua12 and Ada 15 and also in a signal 1 at the outputs of the elements Aub12 and Adb15. The signal 1 of the elements Aub12 and Adb15 supplies the signal elements ASu12 and ASd15, respectively, whereby the acceptance of the call is acknowledged by the lighting of the corresponding signal lamp. The leads LAub12 and LAdb15 thus carry a signal 1 and the leads LASu12 and LASd15 a signal 0. This results in the following new output states: S12 (FIGURE 6)=0, Fi12=7, S15=0, Fi15=1, Fk=0, 52=1, 53=0, Fua=0, Fub=1.

With the signal change in lead L52 from 0 to 1 the output of element 70 (FIGURE 8) becomes 0. Since the safety circuit SS (FIGURE 14) supplies a signal 1 the element 70 receives a signal 0. As mentioned lead LZE, in the rest position of the cabin, carries a signal 0 so that all inputs of element 73 are 0 and its output is 1. This results in an output 0 at the element Wa of the memory element MW determining the travel distance and in an output 1 at element Wb.

Figure 9:
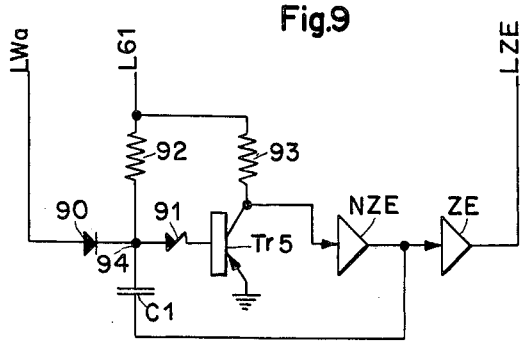
FIGURE 9 is a diagram of a time element.

In the rest position of the cabin and previous to the element Wa taking the state 0 the time element according to FIGURE 9 has the following basic state: Lead LWA=1. The condenser C1 is loaded and a control current is produced for transistor Tr5. Through this its output is 0 resulting for the element NZE in an output 1 and for the element ZE in an output 0. With the change of the signal in the lead LWa from 1 to 0 the condenser is unloaded through diode 90 resulting in the potential at point 94 decreasing to the value 0. This leads to the following new output states: Tr5=1, NZE=0, ZE=1.

The signals 0 appearing in the leads LFua and LWa result in the output of element 55 becoming 1, which makes selective transistor TrSu (FIGURE 14) through the lead L55. Simultaneously the signal 1 in lead LWb renders conductive transistor TrMV so that the locking magnet MV is energized, the door in floor 11 is locked and thereby closes the open contact KV of this door. Thus the relay Su is supplied voltage through lead L63 and is closed. With the relay Su is also closed its auxiliary contact KSu2 so that the braking coil MB is energized, the brake B is released and the motor Mo starts the cabin with an upward travel.

With the appearance of the signal 1 on the lead LFub (FIGURE 6) on the one hand the step-by-step switching device Sp (FIGURE 2) is brought to upward direction travel by the following new output states Fa=0, Fb=1, 41=1, 42=0, 38=0, 39=1. Thereby SBb=0, SBa=1 so that lead LSBb carries a signal 0 and lead LSBa a signal 1.

Owing to the upward moving of the cabin the induction switch Gp (FIG. 1) comes out of the action of the lug F11 so that the lead LGp is supplied with a signal 1. This results in the following new output states in FIG. 2: 39=, 30=0. The leads L30, LSBb and LFa all carry a signal 0 and the leads LSBa and LFb a signal 1. These states result in that all inputs of the element Za11 are 0 while all other elements Za and Zb at least have one input with the value 1. This results in the following new output states: Za11=1, Zc11=0, Zd11=1, Pe11=0, 40=1, 41=0, 38=1, Pe12=1, 36=0. Since the element Pe12 has received the output 1 the step-by-step switching device is in position 12.

The call at floor 12 is a directional call requiring a stop of the cabin at this floor. With the change of the step-by-step switching device from position 11 to position 12 the lead LPS12 (FIGURE 7) receives a signal 0 and the lead LZd11 receives a signal 1. Since also lead LASu12, owing to the call in floor 12 carries a signal 0 the element Hue12 transmits an output signal 1 resulting in the following changes of states: NHu=0, Hu=1, NH=0.

As soon as the induction switch Gp attains the zone of the lug F12 the signal in lead LGp leading to element 72 (FIGURE 8) changes from 1 to 0. Since, however, this element 72 supplies a delayed output 1 all inputs of element 74 are 0 for a short period so that its output signal 1 cancels the memory element MW. The signal change thereby occurring in lead LWa from 0 to 1 produces an output 0 at element 55 (FIGURE 6) and the relay Su so that the transistor TrSu (FIGURE 14) is locked and the relay Su is released. Thereby the auxiliary contact KSu2 is opened, the brake B is initiated and the cabin stops. The signal change on lead LWb produces the release of the locking magnet MV resulting in the unlocking of the door in floor 12 and in the opening of the corresponding contact KV. The signal change from 1 to 0 thereby produced in lead LWb (FIGURE 4) produces an output signal 1 at the element E12 cancelling over the lead LE12 the memory element MAu12 (FIGURE 5). In consequence thereof the stop signal 0 in lead LNH (FIGURE 7) changes to 1.

The signal change in lead LGp from 1 to 0 results in the following new states in the step-by-step switching device (FIGURES 2 and 3): 42=1, SBa=0, SBb=1, 30=1. Consequently the output of element Za11 becomes 0.

The mentioned signal change from 0 to 1 on lead LWa further results in a re-loading of condenser C1 (FIGURE 9) of the time element through resistance 92. However, the output LZE changes only when the condenser C1 is loaded so that the cabin remains in stop position in spite of the call present in floor 15.

It shall now be assumed that a passenger enters the cabin in floor 12 and actuates the push-button DC14 (FIGURE 4). The signal 1 produced thereby is stored in the memory element MC14. The signal change from 0 to 1 produced thereby in lead LCb14 results in FIGURE 6 in the following new output states: S14=0 and Fi14=1.

As soon as the door on floor 12 is closed and the condenser C1 of the time element (FIGURE 9) loaded again, all inputs of element 73 (FIGURE 8) are 0, so that the travel may start again in the manner described for the first travel example.

As the travel continues the induction switch Gp leaves the zone of effect of lug F12 whereby the signal change from 0 to 1 on lead LGp produces a change of state of the elements Za12, Zc12, Zd12, Pe12, and Pe13 in a manner similar to that described for the first travel example for the leaving of the induction switch Gp out of the range of the lug F11. These changes of state have brought the step-by-step switching device from position 12 to position 13. As the induction switch Gp leaves the lug F13 the next change of position from 13 to 14 occurs.

Since in the position 14 of the step-by-step switching device the lead LPS14 (FIGURE 7) carries a signal 0 both inputs of element HCe14 are 0 resulting in the following new output states: HCe14=1, NHC=0, HC=1, NH=0. With the entry of the lug F14 into the induction switch Gp the cabin is brought to stop in floor 14 as has been described for the stopping at floor 12 already.

After the passenger has left the cabin in floor 14 and the time element has allowed further travel, the latter is initiated due to the call stored in floor 15. Thereby the step-by-step switching device changes from position 14 to position 15 resulting in the following changes of state: LZd14 (FIGURE 6)=1, Fi15=0, Fk=1, 52=0, 71 (FIGURE 8)=1, LPS15 (FIGURE 7)=0, Hue15=1, NHu=0, Hu=1, NH=0. As the induction switch Gp reaches the lug F15, the stop is initiated as described with reference to the first example.

As soon as the sliding path 26 actuates the end switch ESu (FIGURE 1) a signal 0 is produced in lead LESu (FIGURE 2). This results in an output 1 for the element 44 and therefore in an output 0 for the elements SBa and SBb each. This further results in all inputs of the elements Za (FIGURE 3) becoming 0 so that all zone units Z of the step-by-step switching device are brought into the initial position for downward travelling provided that this had not already happened by the normal control sequence in this step-by-step switching device.

It is now assumed that the passenger entering in floor 15 actuates the push-button DC11. The output signal 2 thereby appearing at this push-button element is stored in the memory element MC11 leading to the following new output states: Cb11 (FIGURE 4)=1, S11 (FIGURE 6)=0, Fg11=1, Fh=0.

The signal change to 0 of the timing element results in the production of a signal 1 by element 53 and consequently in the cancelling of the memory element MFu. The signal change from 0 to 1 thereby produced in lead LFua results in an output signal 0 at element 44 (FIGURE 2). At this moment the elements of the step limitator SB show the following output plates: 40=0, 41=1, 42=0, 36=1, 37=0, 38=0, 39=1, SBb=0, SBa=1.

The signal change in lead LFub changes from 1 to 0 results in the following new output states: 51=1, 53=0, 71 (FIGURE 8)=0, 73=1, Wa=0, Wb=1, Fda (FIGURE 6)=0, Fda=1. By this the downward travel direction is determined.

By the signal 1 appearing in lead LFdb the step-by-step switching device (FIGURES 2, 3) is set to downward travel by the following change of state: Fb=0, Fa=1, 41=0, 38=1, 39=0, 42=1, SBa=0, SBb=1 so that lead LSBb carries a signal 1 and lead LSBa a signal 0.

With the change of the signal from 1 to 0 in the lead LWa the condenser C1 (FIGURE 9) is discharged over the diode 90. This results in the following new output states of the time element: Tr5=1, NZE=0, ZE=1.

With this change of the signal in lead LWa the other input of element 54 (FIGURE 6) becomes 0 and its output carries a signal 1 rendering selective the transistor TrSd (FIGURE 14) over the lead L54. Simultaneously the signal 1 in the lead LWb renders conductive the transistor TrMV so that the locking magnet MV is energized, the door in floor 15 is locked and the open contact KV of this door is closed. Thereby the relay Sd comes under tension over lead L63 so that it is closed. Together therewith auxiliary contact KSd2 is also closed so that the braking coil MB is energized, the brake B is released and the motor Mo starts the cabin for downward travel.

By the downward movement of the cabin the induction switch Gp leaves the zone of the lug F15 so that the lead LGp is supplied with a signal 1. This results in the following new output states: 42=0 and further 30=0. The leads L30, LSBa and LFb carry a signal 0 and the leads LSBb and LFa a signal 1. These states result in all inputs of the element Zb14 being 0, while all other elements Za and Zb have at least one input with the value 1. This results in the following new output states: Zb14=1, Zd14=0, Ze14=1, Pe15=0, 40=1, Pe14=1, 36=0, 37=1, 38=0. Since the element Pe14 has received the output 1 the step-by-step switching device is in position 14.

As soon as the induction switch Gp reaches the lug F14 the signal in lead LGp changes from 1 to 0. This results in the following new output states: 39=1, SBb=0, SBa=1, 30=1. Thus Zb14 becomes 0.

Upon further travelling of the cabin the output states of the elements Zb13, Zb12 and Zb11, respectively, are modified in analogous manner when the induction switch Gp leaves the lugs F14, F13 and F12, respectively, resulting in a modification of the state of elements Pe13, Pe12 and Pe11, respectively, with corresponding change of the position of the step-by-step switching device.

In position 11 of the step-by-step switching device the lead LPS11 (FIGURE 7) carries a signal 0 resulting in the following new output states: HCe11=1, NHC=0, HC=1, NH=0. The signal 0 in lead LNH leads to the stopping of the cabin in the manner described for the stop in floor 12.

As soon as the sliding path 26 actuates the end switch ESd (FIGURE 1) a signal 0 is produced in lead LESd (FIGURE 2). This results in an output 1 for the element 43 and consequently in an output 0 for the element SBa and SBb each. This further results in all inputs of the elements Zb becoming 0 so that all zone units Z of the step-by-step switching device are brought into the initial position for upward travelling, provided that this has not already happened by the normal control sequence in this step-by-step switching device.

As the position 11 of the step-by-step switching device is reached the lead LZc11 (FIGURE 6) carries a signal 1 and the following changes occur in the output signals: Fg=0, Fh=1, 51=0, 71 (FIGURE 8)=1.

As the timing element runs out the element 53 supplies an output signal 1 resulting in a cancelling of the memory element MFd. The signal change produced thereby in lead LFda from 0 to 1 produces an output signal 0 at element 43 (FIGURE 2). At this moment the elements of the step limitator SB have the following output states: 36=1, 37=0, 38=1, 39=0, 40=0, 41=0, 42=1, SBa=0, SBb=1, so that the control is in the same position as has been described in Rest Position of the Control.

The elevator plant described in the preceding example is provided with a collective control in which the elevator may be differently influenced by the outer calls "up" and "down." There are of course also collective controls known in which only one outer call is present for each floor. The described control method may also be used for this type of collective controls whereby the element determining the stop and associated to the second outer call may be dispensed with.

I claim:

1. In an elevator control for a multi-floor structure serviced by an elevator including a cabin and means for moving said cabin in a first or second direction and having static switching means: a first plurality of call influenced memories, each of said memories being associated with a floor and a first direction of travel for remembering which floor called for said elevator and which direction of travel is called for with respect to said floor, a second plurality of call influenced memories each of said memories being associated with a floor and a second direction of travel for remembering which floor called for said elevator and which direction of travel is called for with respect to said floor, a first plurality of floor-call switches, each on a different floor, connected respectively to said call influenced memories of said first plurality whereby a passenger at a floor can call for said elevator to travel in a first direction with respect to said floor, a second plurality of floor-call switches, each on a different floor, connected respectively to said call influenced memories of said second plurality whereby a passenger at a floor can call for said elevator to travel in a second direction with respect to said floor, a position indicating means for indicating the position of said cabin, direction indicating means for indicating the direction of travel of said cabin, a first plurality of coincidence elements connected to said first plurality of call influenced memories and said position indicating means for indicating when said cabin is at the floor whose floor-call switch in a first direction was operated, a second plurality of coincidence elements connected to said second plurality of call influenced memories and said position indicating means for indicating when said cabin is at the floor whose floor-call switch in a second direction was operated, first collective means responsive to said first plurality of coincidence elements and said direction indicating means for stopping said cabin only when said position indicating means and said first plurality of call influenced memories indicate said cabin is at any floor called for by said first plurality of floor-call switches and said cabin is moving in said first direction, and second collective means responsive to said second plurality of coincidence elements and said direction indicating means for stopping said cabin only when said position indicating means and said second plurality of call influenced memories indicate said cabin is at any floor called for by said second plurality of floor-call switches and said cabin is moving in said second direction.

2. In an elevator control for a multi-floor structure serviced by an elevator including a cabin and means for moving said cabin in a first or second direction and having static switching means: a first plurality of call influenced memories, each of said memories being associated with a floor and a first direction of travel for remembering which floor called for said elevator and which direction of travel is called for with respect to said floor, a second plurality of call influenced memories, each of said memories being associated with a floor and a second direction of travel for remembering which floor called for said elevator and which direction of travel is called for with respect to said floor, a first plurality of floor-call switches, each on a different floor, connected respectively to said call influenced memories of said first plurality whereby a passenger at a floor can call for said elevator to travel in a first direction with respect to said floor, a second plurality of floor-call switches, each on a different floor, connected respectively to said call influenced memories of said second plurality whereby a passenger at a floor can call for said elevator to travel in a second direction with respect to said floor, a position indicating means for indicating the position of said cabin, direction indicating means for indicating the direction of travel of said cabin, a first plurality of coincidence elements connected to said first plurality of call influenced memories and said position indicating means for indicating when said cabin is at a floor whose floor-call switch in a first direction was operated, a second plurality of coincidence elements connected to said second plurality of call influenced memories and said position indicating means for indicating when said cabin is at a floor whose floor-call switch in a second direction was operated, a full-load switch in said cabin for generating a full-load signal when said cabin is fully loaded, first collective means responsive to said first plurality of coincidence elements, said full-load signal, and said direction indicating means for stopping said cabin only when said position indicating means and said first plurality of call influenced memories indicate said cabin is at any floor called for by said first plurality of floor-call switches and said cabin is moving in said first direction and said cabin is not fully loaded, and second collective means responsive to said second plurality of coincidence elements, said full-load signal, and said direction indicating means for stopping said cabin only when said position indicating means and said second plurality of call influenced memories indicate said cabin is at any floor called for by said second plurality of floor-call switches and said cabin is moving in said second direction and said cabin is not fully loaded.

3. In an elevator control for a multi-floor structure serviced by an elevator including a cabin and means for moving said cabin in a first or second direction and having static switching means: a first plurality of call influenced memories, each of said memories being associated with a floor and a first direction of travel for remembering which floor called for said elevator and which direction of travel is called for with respect to said floor, a second plurality of call influenced memories each of said memories being associated with a floor and a second direction of travel for remembering which floor called for said elevator and which direction of travel is called for with respect to said floor, a first plurality of floor-call switches, each on a different floor, connected respectively to said call influenced memories of said first plurality whereby a passenger at a floor can call for said elevator to travel in a first direction with respect to said floor, a second plurality of floor-call switches, each on a different floor, connected respectively to said call influenced memories of said second plurality whereby a passenger at a floor can call for said elevator to travel in a second direction with respect to said floor, a third plurality of call influenced memories for remembering the floor called for regardless of the direction of travel, a plurality of cabin-call switches in said cabin and connected respectively to the call influenced memories of said third plurality, a position indicating means for indicating the position of said cabin, direction indicating means for indicating the direction of travel of said cabin, a first plurality of coincidence elements connected to said first plurality of call influenced memories and said position indicating means for indicating when said cabin is at a floor whose floor-call switch in a first direction was operated, a second plurality of coincidence elements connected to said second plurality of call influenced memories and said position indicating means for indicating when said cabin is at a floor whose floor-call switch in a second direction was operated, a third plurality of coincidence elements connected to said third plurality of call influenced memories and said position indicating means for indicating when said cabin is at a floor called for by said cabin-call switches, first collective means responsive to said first plurality of coincidence elements and said direction indicating means for stopping said cabin only when said position indicating means and said first plurality of call influenced memories indicate said cabin is at any floor called for by said first plurality of floor-call switches and said cabin is moving in said first direction, second collective means responsive to said second plurality of coincidence elements and said direction indicating means for stopping said cabin only when said position indicating means and said second plurality of call influenced memories indicate said cabin is at any floor called for by said second plurality of floor-call switches and said cabin is moving in said second direction, and third collective means responsive only to said third plurality of coincidence elements for stopping said cabin whenever said third plurality of coincidence elements indicate said cabin is at any floor called for by said cabin-call switches.

4. In an elevator control for a multi-floor structure serviced by an elevator including a cabin and means for moving said cabin in a first or second direction and having static switching elements: a first plurality of call influenced memories, each of said memories associated with a floor and a first direction of travel for remembering which floor called for said elevator and which direction of travel is called for with respect to said floor, a second plurality of call influenced memories each of said memories associated with a floor and a second direction of travel for remembering which floor called for said elevator and which direction of travel is called for with respect to said floor, a first plurality of floor-call switches, each on a different floor, connected respectively to said call influenced memories of said first plurality whereby a passenger at a floor can call for said elevator to travel in a first direction with respect to said floor, a second plurality of floor-call switches, each on a different floor, connected respectively to said call influenced memories of said second plurality whereby a passenger at a floor can call for said elevator to travel in a second direction with respect to said floor, a third plurality of call influenced memories for remembering a floor called for regardless of the direction of travel, a plurality of cabin-call switches in said cabin and each connected respectively to said call influenced memories of said third plurality, a position indicating means for indicating the position of said cabin, direction indicating means for indicating the direction of travel of said cabin, a first plurality of coincidence elements connected to said first plurality of call influenced memories and said position indicating means for indicating when said cabin is at a floor whose floor-call switch in a first direction was operated, a second plurality of coincidence elements connected to said second plurality of call influenced memories and said position indicating means for indicating when said cabin is at a floor whose floor-call switch in a second direction was operated, a third plurality of coincidence elements connected to said third plurality of coincidence elements and said position indicating means for indicating when said cabin is at any floor called for by said cabin-called switches, a full-load switch in said cabin for generating a full-load signal when said cabin is fully loaded, first collective means responsive to said first plurality of coincidence elements, said full-load signal, and said direction indicating means for stopping said cabin only when said position indicating means and sad first plurality of call influenced memories indicate said cabin is at any floor called for by said first plurality of floor-call switches, and said cabin is moving in said first direction and is not fully loaded, second collective means responsive to said second plurality of coincidence elements, said full-load signal, and said direction indicating means for stopping said cabin only when said position indicating means and said second plurality of call influenced memories indicating said cabin is at any floor called for by said second plurality of floor-call switches and said cabin is moving in said second direction and is not fully loaded, and third collective means responsive to said third plurality of coincidence elements for stopping said cabin when said position indicating means and said third plurality of call influenced memories indicate said cabin is at any floor called for by said cabin-call switches, regardless of the direction of travel of said cabin.

5. The apparatus of claim 4 wherein said position indicating means includes pulse generating means associated with said cabin and said floors whereby a pulse is generated whenever said cabin passes a floor, and a pulse-responsive stepping memory means connected to said pulse generating means for generating a different position indicating signal for each of said floors and wherein each of the call influenced memories transmits a floor desired signal in response to the operation of the associated call switch.

6. The apparatus of claim 5 wherein each of the coincidence elements of said pluralities has a first input for receiving one of the position indicating signals, each of the coincidence elements of said first plurality has a second input for receiving one of the floor desired signals generated by said first plurality of call influenced memories, each of the coincidence elements of said second plurality has a second input for receiving one of the floor desired signals generated by said second plurality of call influenced memories, each of the coincidence elements of said third plurality has a second input for receiving one of the floor desired signals generated by said third plurality of call influenced memories, and each of said coincidence elements having an output for generating a position equality signal when there is a coincidence of signals at its inputs.

7. The apparatus of claim 5 wherein said direction indicating means generates a first direction signal or a second direction signal and said first collective means includes first combining means having a plurality of inputs connected to the outputs of said first plurality of coincidence elements and an output so that any position equality signal received at any of its inputs is transferred to its output, and second collective means includes second combining means having a plurality of inputs connected to the outputs of said second plurality of coincidence elements and an output so that any position equality signal received at any of its inputs is transferred to its output, and third collective means includes third combining means having a plurality of inputs connected to the outputs of said third plurality of coincidence elements and an output so that any position equality signal received at any of its inputs is transferred to its output, said first collective means further including a first switching means having a first input connected to the output of said first combinating means, a second input for receiving the first direction signal, a third input for received the full-load signal and an output for transmitting a stop signal whenever a position equality signal is reecived coincidently with the presence of said first direction signal and the absence of said full-load signal, said second collective means further including a switching means having a first input connected to the output of said second combining means, a second input for receiving the second direction signal, a third input for receiving the full-load signal and an output for transmitting a stop signal whenever a position equality signal is received coincidently with the presence of said second direction signal and the absence of said full-load signal.

8. The apparatus of claim 6 further including a common collecting means having a first input connected to the output of said third combining means, a second input connected to the output of said first switching means, a third input connected to the output of said second switching means, and an output for stopping said cabin whenever either a position equality signal is received from said third combining means, or a stop signal is received from either of said switching means.

References Cited by the Examiner

UNITED STATES PATENTS

| | | | |
|---|---|---|---|
| 2,619,197 | 11/1956 | Glaser et al. | 187—29 |
| 2,806,554 | 9/1957 | Hall et al. | 187—29 |
| 3,040,838 | 6/1962 | Suozzo et al. | 187—29 |

OTHER REFERENCES 1,109,848, June 29, 1961, German application (4 pp. spec., 4 sht. dwg.).

ORIS L. RADER, *Primary Examiner.*

MILTON O. HIRSHFIELD, *Examiner.*